W. H. DUPRÉ.
LUBRICATING MEANS.
APPLICATION FILED APR. 4, 1908.
927,337.
Patented July 6, 1909.
2 SHEETS—SHEET 1.
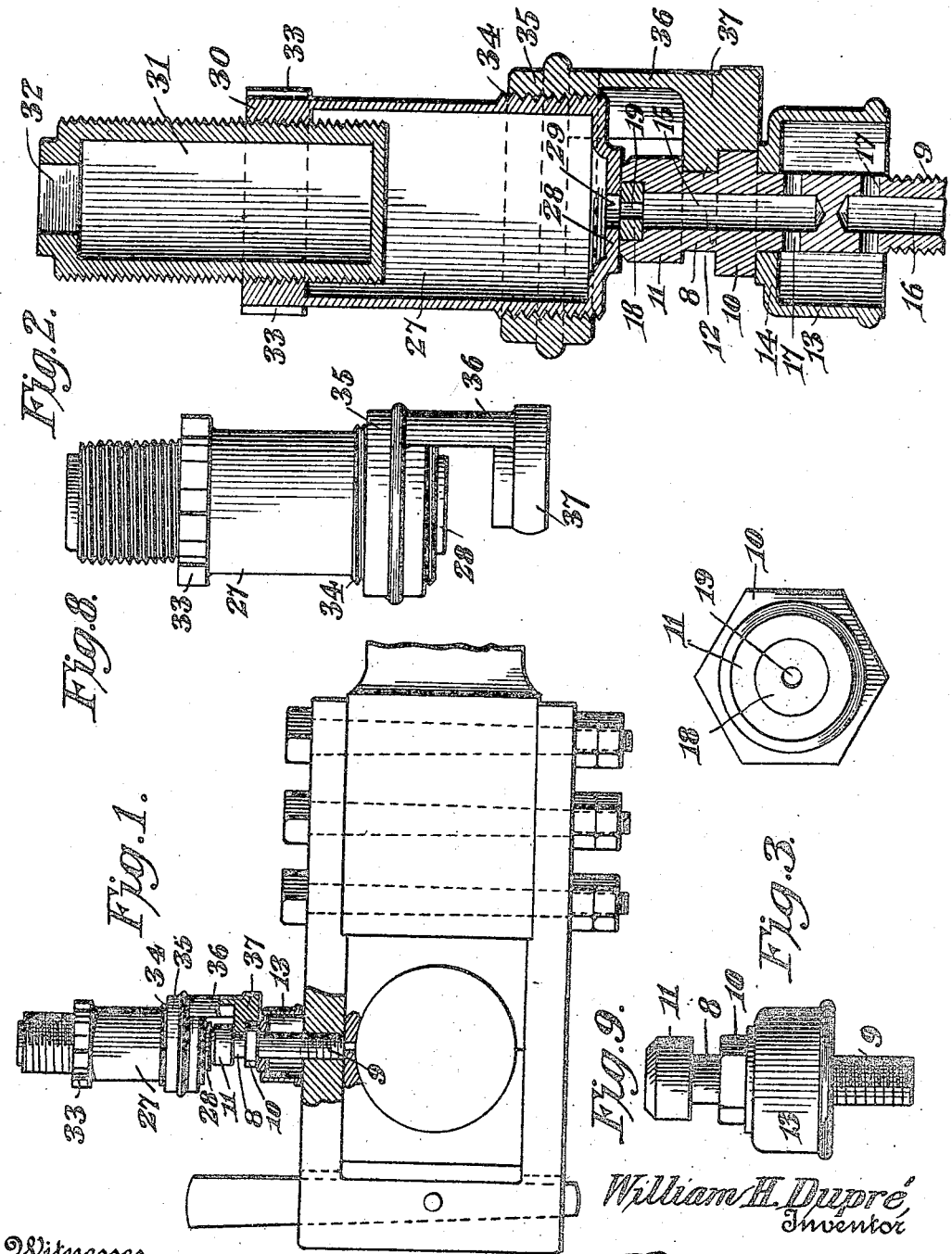
William H. Dupré, Inventor
Witnesses

W. H. DUPRÉ.
LUBRICATING MEANS.
APPLICATION FILED APR. 4, 1908.

927,337.

Patented July 6, 1909.
2 SHEETS—SHEET 2.

William H. Dupré Inventor

Witnesses

By
Attorney

UNITED STATES PATENT OFFICE.

WILLIAM HENRY DUPRÉ, OF VICKSBURG, MISSISSIPPI.

LUBRICATING MEANS.

No. 927,337.  Specification of Letters Patent.  Patented July 6, 1909.

Application filed April 4, 1908. Serial No. 425,185.

*To all whom it may concern:*

Be it known that I, WILLIAM H. DUPRÉ, a citizen of the United States, residing at Vicksburg, in the county of Warren and State of Mississippi, have invented a new and useful Lubricating Means, of which the following is a specification.

In lubricators of the compression grease cup type and particularly those employed on locomotive rods and the like, it is the ordinary practice to employ a compression cup at each bearing to be lubricated.

One of the principal objects of this invention is to provide novel mechanism of a simple nature, whereby a separate compression lubricator for each bearing is unnecessary, and holders for the lubricant are employed in connection with a single portable compression cup having means whereby it can be quickly and effectively attached to such holders and removed therefrom so that lubricant can be supplied to the same.

Two simple forms of the invention are disclosed in the accompanying drawings, but it will be evident from an inspection of the claims hereto appended that said invention is by no means limited to the embodiment herein set forth.

Figure 5:
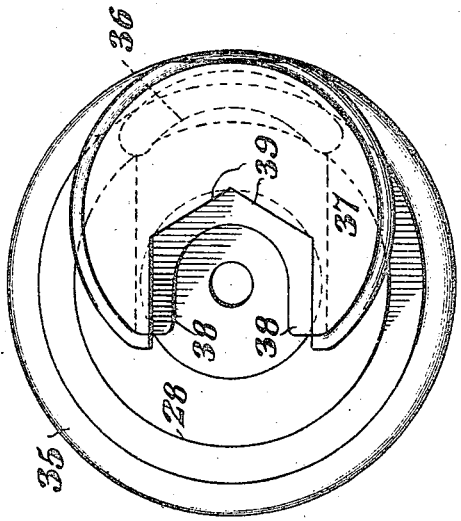
Figure 7:
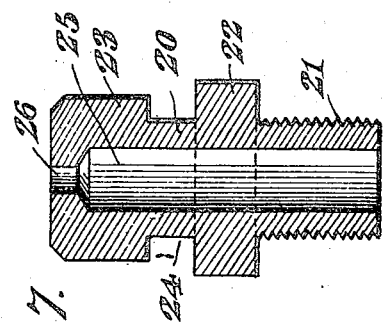
Figure 4:
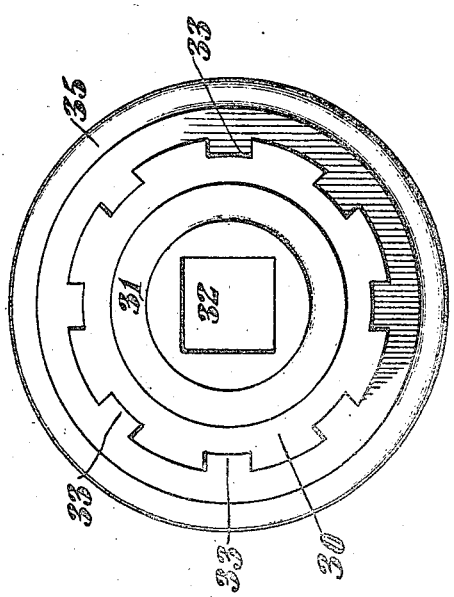
Figure 6:
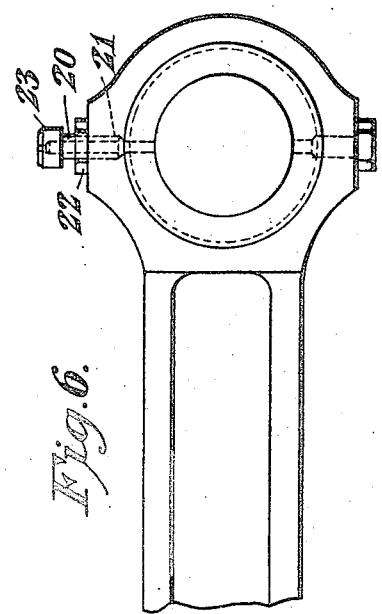

In the drawings: Figure 1 is a side elevation of one end of a rod showing the lubricator in position thereon, and illustrated partially in section. Fig. 2 is an enlarged vertical sectional view through the lubricator. Fig. 3 is a top plan view of the receiving plug. Fig. 4 is a top plan view of the grease cup. Fig. 5 is a detail plan view of the same and of the yoke for connecting it to the plug. Fig. 6 is a side elevation of a rod showing a slightly different form of lubricant receiver thereon. Fig. 7 is a vertical sectional view through the plug, the same being on an enlarged scale. Figs. 8 and 9 are respectively side elevations of the grease cup and receiving plug illustrated in Figs. 1 and 2 and indicating clearly their detachability.

Similar reference numerals designate corresponding parts in all the figures of the drawings.

In the embodiment disclosed in Figs. 1–5 and 8 and 9, a lubricant receiving member is employed comprising a plug 8 having one end exteriorly threaded as shown at 9 so that it may be screwed into the part to be lubricated. This plug is provided between its ends with an angular enlargement 10, whereby it can be turned, and its outer end has an annular enlargement 11 spaced from the angular enlargement 10, thereby forming an annular groove or seat 12.

A casing 13 surrounds the inner portion of the plug, and has an outer end wall 14 through which said plug passes and against which the angular enlargement 10 is abutted. This casing terminates short of the inner end of the plug. The plug is provided with a longitudinal conduit or chamber comprising sections 15 and 16, the outer section 15 opening through the outer end of the plug, the inner section 16 opening through the inner end of the plug, and these sections having offset or transverse ports 17 at their inner ends, which communicate with the interior of the casing 13. The outer end of the section 15 is preferably contracted by a disk or washer 18 located therein and having a small port 19 therethrough. Instead of this type of receiving member, a much simpler form may be employed, as illustrated in Figs. 6 and 7. In this embodiment of the invention, the plug 20 has its inner end threaded as shown at 21, and has an angular enlargement 22 between its ends. It is also provided with an outer head 23 spaced from the enlargement 22 and forming an annular groove or seat 24. A conduit or chamber 25 is formed longitudinally in the plug, the outer end being contracted to form an inlet port 26. These plugs or receiving members, as illustrated in Figs. 1 and 6 are threaded into the parts to be lubricated so that the inner ends of their channels communicate with the bearings.

A lubricant delivering member is employed in the form of a compression grease cup comprising a barrel 27 having an inner end wall 28 provided with a discharge orifice 29 and an outer end wall 30, through which is threaded an expelling plunger 31. This plunger is preferably hollow, and has an angular opening 32 in its outer end to receive an instrument for turning the same. The barrel 27 has a peripheral series of teeth 33 at one end to be engaged by a spanner, while its other end is exteriorly threaded as shown at 34.

A connecting yoke is employed comprising a ring 35 in which the barrel 27 is adjustably threaded, this ring being connected by a web 36 with a hook 37. The hook, as illustrated more particularly in Fig. 5, is bifurcated, forming a pair of fingers 38 that are arranged to embrace the plugs 8 or 20 and be received in the annular grooves 12 or 24. The said hook furthermore has an angular socket 39 that receives the angular enlargements 10 or 22 of the plugs, which thus prevent the turning of the yoke.

In use, the receiving members or plugs are applied to the bearings, either form being employed as necessity or desire may dictate or seem best. But one delivering member or grease cup is necessary for a series of these, and it will be evident by reference to Figs. 1 and 2 that when it is desired to supply lubricant to the plugs or receiving members, it is only necessary to engage the hook 37 with the plug, then turn the barrel 27 until its inner end firmly abuts against the outer end of the plug, whereupon the discharge orifice 29 will register with the inlet port 19 of said plug. The plunger 31 is then screwed into the barrel, whereupon the lubricant will be forced into the plug, filling the chamber or conduit sections and the interior of the casing 13. In fact in applying these devices, inasmuch as solid lubricant is employed, experience has demonstrated that when the hook 37 has been attached to a plug, if the plunger 31 is engaged and rotated, the resistance occasioned by said lubricant will be sufficient to turn the barrel 27 and cause it to abut against the plug before the plunger will turn in said barrel, and the lubricant be thereby expelled. To remove the grease cup, it is only necessary to rotate the barrel 27 in a direction to disengage the plug, whereupon the binding engagement between the parts will be relieved and the hook can be slipped from said plug, as will be evident. With this structure therefore, the plugs in themselves constitute reservoirs. The advantage for the form disclosed in Fig. 2 resides more particularly in the fact that a greater amount of lubricant can be supplied at one time. The mechanism is particularly advantageous in that a grease cup is not necessary for each bearing, and the single grease cup, as disclosed, can be quickly applied to and detached from the different plugs or holders. Moreover, when applied, it is effectively locked in position, so that the proper supply of lubricant to the bearings is assured.

From the foregoing, it is thought that the construction, operation and many advantages of the herein described invention will be apparent to those skilled in the art without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

1. In a lubricating apparatus, the combination of a lubricant-receiving member mounted in fixed position on the article to be lubricated, a removable lubricant-delivering member arranged in abutting relation to the first member, the abutting parts of the members having registering ports, and a yoke supported wholly by and detachably connected with the receiving member and carrying the delivering member and with which the latter is removable.

2. In lubricating means of the character disclosed, the combination with a lubricant receiving member, of a lubricant delivering member including a barrel and an expelling plunger operating therein, and a connecting device that detachably engages one member and is adjustably engaged by the other member.

3. In lubricating means of the character disclosed, the combination with a lubricant receiving member, of a lubricant delivering member, and a connecting yoke that detachably engages the receiving member and is adjustably engaged by the lubricant delivering member.

4. In lubricating means of the character disclosed, the combination with a lubricant receiving member, of a delivering member, and a connecting yoke having a hook at one end that detachably engages the receiving member and having a ring at the other end in which the lubricant delivering member is adjustably engaged.

5. In lubricating means of the character disclosed, the combination with a plug having a threaded end and provided with an angular portion, and a groove located adjacent to the said angular portion, said plug having a lubricant receiving conduit therein, of a yoke having a bifurcated hook that embraces the plug and is seated in the groove, said hook having an angular socket that receives the angular portion of the plug, said yoke also having an interiorly threaded ring, and a grease cup threaded into the ring and adjustable therein toward and from the plug.

6. In a lubricating apparatus, the combination of a lubricant-receiving member fixed on the part to be lubricated and having a port, a lubricant-delivering member resting on the first member and having a port communicating with the first-mentioned port, a yoke carrying the delivering member and removably connected with the receiving member and means for connecting the delivering member and yoke to the receiving member by relative rotary movement between the members while they are held in coöperative relation by the yoke.

7. In lubricating means of the character disclosed, the combination with a lubricant receiving plug having its inner end exteriorly threaded and having a chamber provided with an inlet opening in its outer end, of a lubricant delivering member adjustable toward and from the outer end of the receiving member and having a discharge orifice that registers with the inlet opening of said receiving member when the adjacent ends of the members are together.

8. In lubricating means of the character disclosed, the combination with a receiving member and a yoke for attachment thereto, of a lubricant holding barrel adjustably mounted on the yoke, and an expelling plunger that operates in the barrel.

9. In lubricating means of the character disclosed, the combination with a receiving member and a yoke for attachment thereto, said yoke including a ring that is interiorly threaded, of a lubricant holding barrel threaded in said ring and having a discharge orifice in its inner end, and an expelling plunger threaded into the outer end of the barrel.

10. The combination with a holding plug having one end threaded and provided with a lubricant conduit opening through each end, said plug having an angular enlargement between its ends and having an annular flange spaced from the angular enlargement forming a groove or seat, of a detachable lubricant delivering member having a discharge opening adapted to be registered with the lubricant conduit in one end of the plug, and a yoke engaging said lubricant delivering member and detachably engaging said seat.

11. A lubricating device including a casing having an open side closed by the article to be lubricated, and a plug passing centrally through the end wall of the casing, said plug having a shoulder engaging against the exterior face of said end wall to form a fastening for the casing, said plug at one end being adapted to engage with the article to be lubricated and having a passage extending from its interior to its exterior and opening within said casing.

12. A lubricant holding plug having its inner end threaded and having an angular enlargement, and a casing surrounding a portion of the plug and having an end wall through which the plug passes and against which the enlargement abuts, said plug having conduits respectively opening through the ends of the plug and having ports communicating with the interior of the casing.

13. The combination with a lubricant holding plug having one end threaded, being hollow to form a lubricant holding reservoir therein, having an outlet orifice at one end and an inlet orifice at the opposite end of less diameter than the reservoir, said plug having an angular enlargement, and an annular groove or seat disposed alongside the enlargement, of a detachable lubricant delivering member having in its lower end an orifice adapted to register with the inlet orifice in the lubricant holding plug, and a yoke engaging the delivering member and detachably engaging said plug at the annular seat thereof.

14. A lubricant holding plug having one end threaded and having a lubricant holding reservoir therein that opens through the threaded end, said reservoir having an inlet orifice in the opposite end of less diameter than the reservoir, said plug having an angular enlargement and an annular groove or seat disposed alongside the enlargement, and a casing surrounding a portion of the plug and having an end wall through which the plug passes and against which the angular enlargement abuts, the reservoir in the plug comprising separate sections having lateral ports at their inner ends that open through the sides of the plug and communicate with the interior of the casing.

15. In a device of the character described, the combination with an enlarged cup-shaped casing whose lower edge engages with the article to be lubricated, of a plug passing through the wall of said casing, the lower end of the plug engaging with the article to be lubricated, said plug having a passage extending from its end exterior to the casing to a point within the casing and there opening into the casing, the article-engaging end of the plug being provided with the lubricant delivering passage opening at its upper end into the space within said casing.

In testimony that I claim the foregoing as my own, I have hereto affixed my signature in the presence of two witnesses.

WILLIAM HENRY DUPRÉ.

Witnesses:
J. R. SMITH,
JNO. A. HENNESSEY.